United States Patent [19]

Sellstedt et al.

[11] 3,888,858

[45] June 10, 1975

[54] 3,4-DIHYDRO-4-OXO-2-QUINAZOLINECARBOXYLIC ACIDS, SALTS AND ESTERS AS ANTI-ALLERGIC AGENTS

[75] Inventors: John H. Sellstedt, Pottstown; Charles J. Guinosso, King of Prussia; Stanley C. Bell, Penn Valley, all of Pa.

[73] Assignee: American Home Products Corporation, New York, N.Y.

[22] Filed: Feb. 22, 1974

[21] Appl. No.: 444,945

[52] U.S. Cl.............................. 260/251 QA; 424/251
[51] Int. Cl............................................. C07d 51/48
[58] Field of Search............................ 260/251 QA

[56] References Cited
FOREIGN PATENTS OR APPLICATIONS
1,932,455    9/1970    Germany

*Primary Examiner*—Donald G. Daus
*Assistant Examiner*—Raymond V. Rush
*Attorney, Agent, or Firm*—Richard K. Jackson

[57] ABSTRACT

Anti-allergic agents presenting the following structural formula:

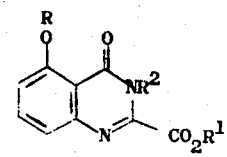

wherein
R is alkyl of one to six carbon atoms or omegahydroxyalkyl of one to three carbon atoms;
$R^1$ is hydrogen, alkyl of one to six carbon atoms cyclohexyl, cyclopentyl, benzyl, phenethyl, alkali metal cation or the ammonium ion; and
$R^2$ is hydrogen or alkoxymethyl containing from two to seven carbon atoms.

8 Claims, No Drawings

3,4-DIHYDRO-4-OXO-2-QUINAZOLINECARBOXYLIC ACIDS, SALTS AND ESTERS AS ANTI-ALLERGIC AGENTS

BACKGROUND OF THE INVENTION

Atopic immediate sensitivity is the chief manifestation found in animals suffering from asthma, hay fever, allergic rhinitis, urticaria, and the like. The substances most frequently responsible for clinically manifest sensitivities are plant pollen, animal feathers and danders, dust, milk and wheat, whether inhaled or ingested.

Atopic hypersensitivity is found in man, dog and other animals. Its occurrance is exceptionally found in the lower animals.

The presence of antibodies associated with atopic reactions in the host serum is established by the passive sensitization of the skin of a normal recipient, after injection of serum from a sensitized host into a skin site followed by injection of antigen into the same area 24 hours later, resulting in a local hive. This is commonly referred to as the Prausnitz-Kustner (P-K) reaction.

The antibody associated with atopic hypersensitivity possesses distinctive features in that it does not in all forms precipitate with its antigen, fails to pass the placenta from mother to fetus, has special affinity for the skin, frequently lacks specificity toward an individual antigen in an individual sensitized by a variety of antigenic factors and is usually labile at about 56°C after 2 hours.

The homocytotropic antibody found in or induced in the rat is related in function and reaction to immunoglobulin E (reagin or IgE) found in the human. The correlation between homocytotropic antibody in the rat and IgE in the human has been established through the common effects obtained from chemical reactions, immunological reactions and drug responses in the two species hosting those antibodies. In the human, reagin is the antibody responsible for atopic immediate hypersensitive reactions. In the rat, the homocytotropic antibody is responsible for atopic immediate hypersensitive reactions.

In theory, reagin, influences the cell membrane of a mast cell by reacting with an antigen, to initiate the reaction(s) within the mast cell which ultimately releases a mediator such as Bradykinin, SRS-A (slow reacting substance-A), histamine, and other unknown substances. The mediator effects a change in surrounding cell wall permeability permitting a rapid change in flow or exudance of mediator(s) from the cells, resulting in an allergic attack symptom. The various methods commonly employed to relieve the symptoms of allergic attack, none of which are considered to be quite acceptable, are to (1) avoid attack by the antigen, (2) block the production of antibody with an immunosuppressant, (3) block the action of the mediators on the cell under attack by administration of anti-histaminics, anti-5-hydroxy-tryptamine (5-HT) or anti-inflammatories, or (4) stimulate the cell under attack to negate the action of the mediator through the action of bronchodilators such as Isoprel or a Xanthine.

The only commercial compound known to date to operate as an anti-allergic primarily by blocking reaction(s) within the mast cells, thereby preventing the production and release of mediators, is disodium cromoglycate (INTAL).

Compounds of the type involved in the present application are disclosed in German Offenlegungsschrift No. 1,932,455, in which pharmaceutical activity of vitamin P type is disclosed. The German reference also indicates that analogous compounds to those claimed in this application reduce capillary permeability and have peripheral analgesic and anti-inflammatory activity.

DESCRIPTION OF THE INVENTION

In accordance with this invention there is provided a method for suppressing allergic manifestations in warm-blooded animals which comprises administering to a sensitive animal an effective amount of a compound of the formula:

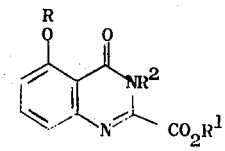

in which
R is alkyl of one to six carbon atoms or omega-hydroxyalkyl of one to six carbon atoms;
$R^1$ is hydrogen, alkyl of one six carbon atoms, cyclohexyl, cyclopentyl, benzyl, phenethyl, an alkali metal cation or the ammonium ion; and
$R^2$ is hydrogen or alkoxymethyl containing from two to seven carbon atoms.

In addition, this invention provides novel chemical compounds of the above described formula.

The preferred compounds of this invention, from the standpoint of their anti-allergy activity are those of the formula:

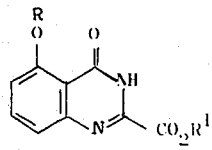

in which
R is methyl, ethyl, propyl or isopropyl and
$R^1$ is hydrogen, methyl, ethyl, propyl, isopropyl,, or the sodium, potassium or ammonium ion.

Each of the compounds disclosed in this application has been demonstrated to relieve allergic manifestations when administered intraperitoneally to sensitized rats. The technique employed to establish the anti-allergic activity of the disclosed compound is reported in Immunology, vol. 16, pp. 749–760 (1969) and involves four male Charles River rats (200–250 grams body weight) per group to provide a control, a host for administration of a standard anti-allergic compound (disodium cromoglycate) and animals for the test compound. The rats were injected intracutaneously on their shaved backs with sera from rats immunized with egg albumin and pertussis vaccine. Twenty-four hours after the initial injections, the test compound is administered intraperitoneally at a dosage level of 200 milligrams per kilogram host body weight. Five minutes later one milliliter of a 0.5 percent solution of Evans blue dye and 8 milligrams of egg albumin is injected intravenously.

After 40 minutes, the animal is sacrificed and the bleb size on its back is measured. The mean bleb size for the animals administered the test compound is calculated and the percent inhibition is determined by comparison with the control animal. A representative number of the compounds were tested at dosage levels considerably below 200 milligrams per kilogram host body weight to establish the activity of the compounds at minimal concentrations as low as 3 milligrams per kilogram host body weight.

The following tests were used to substantiate the anti-allergic properties of the products of this invention.

a. Antagonism of immunologic-induced bronchoconstriction. This technique basically consists of sensitizing rats with an aluminum suspension of egg albumin. After a suitable period, at which time the animals have maximal lung tissue levels of the reaginic (IgE) antibody, the animals were challenged intravenously with antigen and the resulting bronchoconstriction due to antigen-antibody interaction was measured by the method of Rosenthale and Dervinis, Arch. Int. Pharmacodyn. 172:91, 1968. Pretreatment of a sensitized rat with an anti-allergic agent results in an inhibition of this bronchoconstriction. The products of this invention were tested in this preparation and when compared to controls, gave highly significant protection from anaphylactic bronchoconstriction at an intravenous dose as low as 2 milligrams per kilogram host body weight.

b. Antagonism of immunologic-induced histamine release from rat peritoneal mast cells. This technique has been described by Orr et al., Life Sciences 10:805, 1971 and basically consists of using the compound 48/80 (the histamine releasing agent produced by condensation of p-methoxyphenethyl-methylamine and formaldehyde, available from Burroughs Wellcome Co.); to induce histamine release from normal rat mast cells. Abundant experimental evidence exists implicating the mast cell and histamine as prime etiologic agents in atopic disease symptoms, and 48/80 induced release as being analogous to immunologic release of histamine (Kusner et al., J. Pharmacol. Exp. Therap. 184:41, 1972). When the products of this invention were added to the incubating mast cell in conjunction with 48/80, a statistically significant inhibition of histamine release, compared to controls, was obtained.

These two tests further indicate that the products of this invention have the ability to prevent release of allergic mediators from target tissues of allergic (atopic) reactions, such as the skin, lung and mast cell.

Although the mechanism by which the compounds of this invention function is not absolutely known, applicants have found that the compounds of this invention, in a manner believed to be similar to the function of INTAL, block reaction(s) in the mast cell leading to the production and release of mediators.

The compounds of this invention permit the occurrence of a non-productive antigen-antibody interaction by effectively blocking the IgE type reaction.

The compounds of this invention differ in their pharmacological response pattern from known anti-allergics. For example, the compound of Example 3, infra, has no anti-hypertensive activity (no cardiovascular effect, etc.), no central nervous system activity, and no activity against histamine, serotonin, or Bradykinin.

In sum, the compounds of this invention block the release of mediators commonly resulting from the antigen antibody reaction as exemplified in a passive cutaneous anaphylaxis test (PCA) using rat homocytotropic antibody — a known correlate of human reaginic antibody.

By analogy to disodium cromoglycate and its activity correlation between standard test animals, domestic animals and man, the compounds of this invention have been established as anti-allergic agents suitable for the same uses at analogous doses and through the same routes of administration as INTAL.

Thus, there is provided herewith a method for suppressing allergic manifestations of atopic immediate sensitivity in warm-blooded human and non-human animals, the latter including domesticated animals such as the mouse, rat, hamster, gerbil, dog, cat, sheep, goat, horse, cow, and the like, by administering an effective amount of one or more of the compounds disclosed in this application by oral, topical, intraperitoneal, intramuscular or intravenous routes. The compounds of this invention may be administered in conjunction with known compounds effecting anti-histaminic, anti-hypertensive, analgesic, central nervous system depressant, immunosuppressive, anti-serotonin, anti-Bradykinin or endocrinological responses. In addition, those conventional adjuvants known to the art may be combined with the anti-allergics of this invention to provide compositions and solutions for administrative purposes, although it is considered desirable and feasible to employ the anti-allergics as neat or pure compounds without additives other than for purposes of providing suitable pharmaceutical solution or liquid or vapor suspensions.

The effective dose range in test animals has been established to be from about 25 milligrams per kilogram to a dosage resulting in 100 percent prevention of allergic responses at 200 milligrams per kilogram host body weight upon administration intraperitoneally. A lesser amount of activity has been found upon oral administration at 200 milligrams per kilogram host body weight which results in approximate 35 percent prevention of allergic response. As a topical anti-allergic, the doses analogous to that of INTAL, or about 2 milligrams administered as an inhalant as needed prior to attack. Thus, the dosage contemplated for human oral or intraperitoneal use based upon the potency of the compound administered lies from about 750 milligrams to 2 grams, preferable 1 gram to about 1½ grams in unit dosage form to be administered when necessary and to the degree of the desired response, in single or plural doses under the guidance of a physician.

The compounds of this invention are prepared by the reaction as follows:

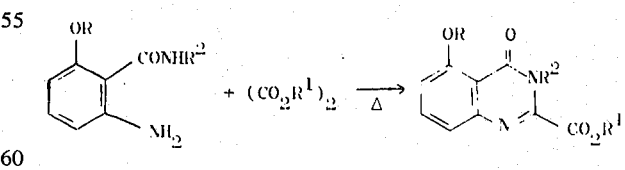

in which the groups R, R$^1$ and R$^2$ are above-defined. The alkoxymethyl group represented as R$^2$ may optionally be introduced into the molecule after ring formation by methods well known in the art. The starting materials are either known compounds or are readily preparable by techniques available to the chemist.

In the working examples, the activity data following the preparative example refers to intraperitoneal activity data obtained at a dosage level of 200 milligrams per kilogram host body weight. The activity data represents the percent inhibition of the mean bleb size of sensitized rats administered the name compound in accordance with the test procedure presented, supra.

EXAMPLE 1

3,4-Dihydro-5-methoxy-4-oxo-2-quinazolinecarboxylic acid ethyl ester

6-Amino-o-anisamide (8.3 g, 0.05 mole), 13.5 ml (0.1 mole) ethyl oxalate, and 25 mg p-toluenesulfonic acid are placed in an oil bath at 170°C. under a nitrogen atmosphere for 6 hours. Ethanol (2.9 ml) is collected in a Dean-Stark trap, and the solid remaining in the flask is triturated with diethyl ether and filtered, giving 9.3 g. The solid is recrystallized from absolute ethanol, giving 3.81 g of white crystals, m.p. 191°–194°C.

Elemental Analysis calc'd for $C_{12}H_{12}N_2O_4$:Calc'd: C, 58.06; H, 4.87; N, 11.29. Found: C, 57.95; H, 5.12; N, 11.23.

Activity at 200 mpk IP 95 percent block.

EXAMPLE 2

3,4-Dihydro-5-methoxy-4-oxo-2-quinazolinecarboxylic acid sodium salt 3,4-Dihydro-5-methoxy-oxo-2-quinazolinecarboxylic acid ethyl ester (6.1 g, 0.0246 mole) as prepared in the preceding example is dissolved in 200 ml of 5 percent sodium hydroxide at room temperature. After 4 hours the solution was acidified to pH 2 with 3N HCl, and the mixture was filtered giving 4.3 g of white crystals, m.p. 208°–209°C.

EXAMPLE 3

3,4-Dihydro-5-methoxy-4-oxo-2-quinazolinecarboxylic acid ammonium salt

The product of the preceding example was dissolved in an equivalent molar amount of ammonium hydroxide plus 75 ml of warm water. The solution was filtered and the filtrate cooled, giving 2.42 g of white crystals, m.p. 165°–168°C. (decomp.).

Elemental Analysis calc'd for $C_{10}H_{11}N_3O_4 \cdot 6H_2O$: Calc'd: C, 48.50; H, 4.93; N, 16.95. Found: C, 48.89; H, 5.43; N, 17.11.

Activity at 200 mpk IP 57% block.

EXAMPLE 4

3,4-Dihydro-3-methoxymethyl-5-methoxy-4-oxo-2-quinazolinecarboxylic acid ethyl ester Hexane washed 57% sodium hydride (7.9 g, 0.188 mole) is added to a solution of ethyl 3,4-dihydro-5-methoxy-4-oxo-2-quinazolinecarboxylic acid ester (44.4g, 0.179 mole) in 400 ml of anhydrous dimethylformamide. After stirring for one-half hour the evolutions of gas ceased, and 14.8 ml (0.197 mole) of chloromethylmethyl ether is slowly added, and the mixture is kept at room temperature for 48 hours. The solvent is removed on a rotary evaporator, ethylacetate is added, and the solution is washed well with water, sodium bicarbonate, cold N sodium hydroxide, brine, and dried with sodium sulfate. The solvent is removed giving 40 g of a brown oil, which is chromatographed on 760 g of Grade III neutral alumina with benzene, giving 21 g of a light yellow solid, m.p. 65°–80°C. Crystallization from ethyl acetate-hexane gives white crystals, m.p. 73°–80°C.

Elemental Analysis calc'd for $C_{14}H_{16}N_2O_5$: Calc'd: C, 57.53; H, 5.52; N, 9.59. Found: C, 57.33; H, 5.52; N, 9.41.

Hydrolysis of the ethyl ester yields the corresponding free carboxylic acid.

What is claimed is:

1. A compound of the formula:

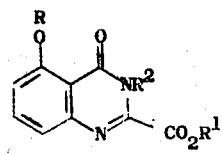

in which

R is alkyl of one to six carbon atoms;

$R^1$ is hydrogen, alkyl of one to six carbon atoms, an alkali metal cation or the ammonium ion; and $R^2$ is hydrogen or alkoxymethyl containing from two to seven carbon atoms.

2. A compound of claim 1 of the formula:

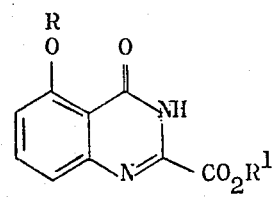

in which

R is methyl, ethyl, propyl or isopropyl and $R^1$ is hydrogen, methyl, ethyl, propyl, isopropyl, or the sodium, potassium or ammonium ion.

3. A compound of claim 1 which is 3,4-dihydro-5-methoxy-4-oxo-2-quinazolinecarboxylic acid.

4. A compound of claim 1 which is 3,4-dihydro-5-methoxy-4-oxo-2-quinazolinecarboxylic acid ethyl ester.

5. A compound of claim 1 which is 3,4-dihydro-5-methoxy-4-oxo-2-quinazolinecarboxylic acid sodium salt.

6. A compound of claim 1 which is 3,4-dihydro-5-methoxy-4-oxo-2-quinazolinecarboxylic acid ammonium salt.

7. A compound of claim 1 which is 3,4-dihydro-5-methoxy-3-methoxymethyl-4-oxo-2-quinazolinecarboxylic acid.

8. A compound of claim 1 which is 3,4-dihydro-5-methoxy-3-methoxymethyl-4-oxo-2-quinazolinecarboxylic acid ethyl ester.

* * * * *